United States Patent [19]
Inoue

[11] Patent Number: 5,761,173
[45] Date of Patent: Jun. 2, 1998

[54] RECORDING AND/OR REPRODUCING APPARATUS AND METHOD FOR DATA REPRODUCTION AND PROCESSING

[75] Inventor: Hiraku Inoue, Kanagawa, Japan

[73] Assignee: Sony Corporation, Tokyo, Japan

[21] Appl. No.: 755,320

[22] Filed: Nov. 22, 1996

[30] Foreign Application Priority Data

Nov. 29, 1995 [JP] Japan .................... 7-332538

[51] Int. Cl.$^6$ .................................. G11B 7/00
[52] U.S. Cl. ............................ 369/83; 369/124
[58] Field of Search .................... 369/32, 60, 83, 369/124, 84, 59, 47

[56] References Cited

U.S. PATENT DOCUMENTS

| | | | |
|---|---|---|---|
| 5,199,019 | 3/1993 | Matsumura et al. | 369/60 |
| 5,471,452 | 11/1995 | Kishi | 369/84 |
| 5,602,811 | 2/1997 | Osusu et al. | 369/59 |
| 5,615,194 | 3/1997 | Kimura et al. | 369/59 |
| 5,615,195 | 3/1997 | Tanizawa | 369/60 |
| 5,617,386 | 4/1997 | Choi | 369/32 |

OTHER PUBLICATIONS

Japanese Patent Publication No. Hei 6-150624, Class G11B, Subclass 27/034, published May 31, 1994.

*Primary Examiner*—Nabil Hindi
*Attorney, Agent, or Firm*—Limbach & Limbach LLP

[57] ABSTRACT

Simple execution of reproduction/processing etc. of data recorded on a recording medium that does not use a plurality of recording/playback devices. A reading unit for reading data from a recording medium, a storage unit for storing data read out by the reading unit, a reading and storing unit for reading out and storing data from and in the storage unit, a writing unit for writing the data read out from the storage unit by the reading and storing unit to the recording medium and an effects unit for performing prescribed effects processings on data to be stored in the storage unit or data read out from the stooge unit are provided, together with a control unit for controlling a reading operation by the reading unit reading out data from the recording medium, reading and storing operations by the reading and storing unit controlling reading out and storing data from and in the storage unit, effects processing operations performed by the effects unit and a writing operation to the recording medium by the writing unit with respectively prescribed timings. The control unit controls the writing operation so that data read out from the recording medium is processed by the effects processing operations and then recorded to the recording medium in an area different from an area where the data has been recorded.

4 Claims, 10 Drawing Sheets

FIG. 3

| | 16bit | | 16bit | | |
|---|---|---|---|---|---|
| | MSB    LSB | MSB    LSB | MSB    LSB | MSB    LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector(00h) | MODE(02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disk Serial No | 10 |
| CORRESPONDING TABLE INDICATION DATA PART | Disk | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| MANAGEMENT TABLE PART (255 PART TABLE) | (01h) start address | | | track mode | 78 |
| | end address | | | link information | 79 |
| | (02h) start address | | | track mode | 80 |
| | end address | | | link information | 81 |
| | (03h) start address | | | track mode | 82 |
| | end address | | | link information | 83 |
| | (FCh) start address | | | track mode | 580 |
| | end address | | | link information | 581 |
| | (FDh) start address | | | track mode | 582 |
| | end address | | | link information | 583 |
| | (FEh) start address | | | track mode | 584 |
| | end address | | | link information | 585 |
| | (FFh) start address | | | track mode | 586 |
| | end address | | | link information | 587 |

U-TOC sector-0

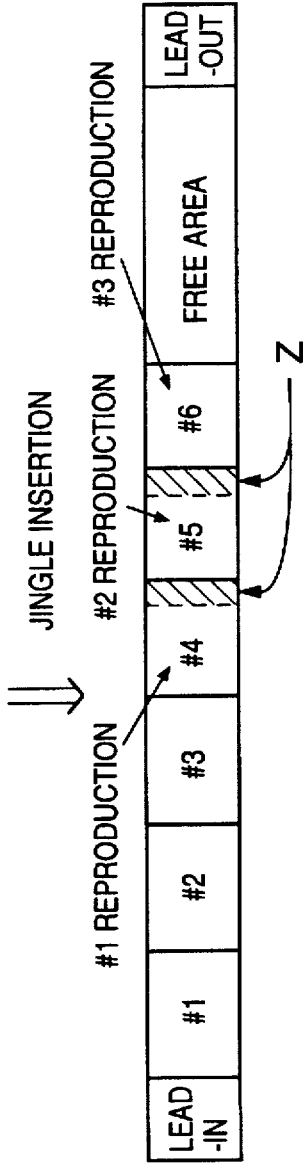

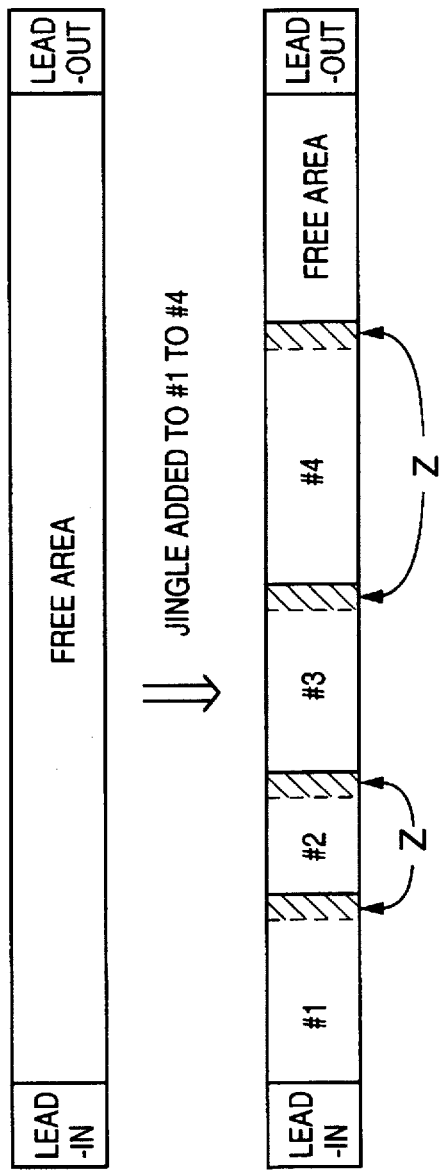

RECORDING AND/OR REPRODUCING APPARATUS AND METHOD FOR DATA REPRODUCTION AND PROCESSING

BACKGROUND OF THE INVENTION

1. Field of the Invention

The present invention relates to a recording/playback device employing a recording medium such as a disc, and more particularly relates to a recording/playback device capable of reproducing and processing data on said recording medium and recording said reproduced and processed data on said recording medium.

2. Description of the Related Art

Various types of recording mediums and corresponding recording/playback devices have been developed and in recent years, systems such as the well-known "minidisc" system where the user can freely record music data etc. have become widespread.

For example, in the case of the minidisc system, management information known as a user TOC (hereinafter referred to as a U-TOC) is recorded separately the main data such as the music data, for managing regions on the disc where the user has carried out recording or where there is not yet anything recorded. The recording device then determines regions for carrying out recording while referring to this U-TOC.

Namely, each of the pieces of music etc. recorded are managed in units known as "tracks" at the U-TOC, with the start and address, etc. being listed. The start address and end address etc. are also listed for regions that have not yet been recorded with anything (free areas).

Then for example, while a certain song is being recorded, the recording device confirms the addresses of the free areas on the disc from the U-TOC and records audio data at this position, or, in the case of over-writing while recording a song, this track address is confirmed and recording of the audio data is carried out.

Each of the various editing processes can therefore be carried out without having to do anything to the actual data on the disc by just re-writing the contents of the U-TOC because regions for each of the tracks are managed using management information such as this kind of U-TOC information.

For example, when one track is divided into two tracks or when two tracks are linked together to form one track, changing the order in which pieces of music are played back can be carried out simply by changing over the track numbers and then playing back.

Further, a recording/playback method described in Japanese Patent Publication Hei. 6-150624 also put-forward by the present applicant where recording and playback is carried out simultaneously in real-time is also well known.

Namely, a recording/playback method is put forward where a first information (music information) read from a disc and externally inputted second information (user audio etc.) are put together to form a third information, with this third information then being recorded on the same disc.

However, in the aforementioned recording/playback methods, after a certain song (track) is recorded on the minidisc, for example, this track is played-back, and, for example, subjected to audio processing such as echo, reverberation, equalization, and fade-in/fade-out etc. This data can therefore not be recorded on another track on the disc and then played back.

OBJECTS AND SUMMARY OF THE INVENTION

It is therefore a first object of the present invention to provide a recording/playback device for recording data that has undergone desired effects processing on the same recording medium.

It is a second object of the present invention to provide a recording/playback method for recording data that has undergone processing such as echo, reverberation, equalization, fade-in and fade-out to the user's preference on the same recording medium.

It is a further object of the present invention to provide a recording medium for recording data that has undergone processing such as echo, reverberation, equalization, fade-in and fade-out to the user's preference.

Therefore, according to an aspect of the present invention, a recording/playback device is provided which comprises a reading unit, a storage unit, a reading and storing unit, a writing unit, an effects unit and a control unit. The reading unit is for reading out data from a recording medium. The storage unit is for storing data read out by the reading unit. The reading and storing unit is for controlling reading out and storing data from and in the storage unit. The writing unit is for writing data read out from the storage unit by the reading and storing unit to the recording medium. The effects unit is for performing prescribed effects processings on data to be stored in the storage unit or data read from the storage unit, and the control unit is for controlling a reading operation by the reading unit reading out data from the recording medium, reading and storing operations by the reading and storing unit controlling reading out and storing data from and in the storage unit, effects processing operations performed by the effects unit and a writing operation to the recording medium by the writing unit with respectively prescribed timings.

Here, the control unit controls the writing operation so that data read out from the recording medium is processed by the effects processing operations and then recorded to the recording medium in an area different from an area where the data has been recorded.

According to a further aspect of the present invention, a recording and playing-back method is provided which comprises the steps of reading out recorded data, storing the readout recorded data, reading out stored data, writing the read out stored data for being recording, performing prescribed effects processings on data for storing or data read out from being stored, and controlling. In the controlling step, the steps of reading out recorded data, storing read out recorded data, reading out stored data, performing prescribed effects processings and writing read out stored data are controlled so that these steps are carried out with respectively prescribed timings.

Here, the step of controlling is carried out to perform the effects processings on data being an object in the steps of reading out recorded data, storing read out recorded data, reading out stored data, writing read out stored data when these steps are executed, so that the recorded data is processed by the effects processings and then recorded.

Moreover, according to a still further aspect of the present invention, a recording medium is provided for use in a recording and playing-back device. The recording and playing-back device comprises a reading unit for reading out recorded data from the recording medium, a storage unit for storing data read out by the reading unit, a reading and storing unit for reading out and storing data from and in the storage unit, a writing unit for writing data read out from the storage unit by the reading and storing unit to the recording medium, an effects unit for performing prescribed effects processings on data to be stored in the storage unit or data read out from the storage unit, and a control unit for controlling the effects unit performing the prescribed effects processings on data being an object for a reading out operation by the reading unit reading out recorded data from the recording medium, reading and storing operations by the reading and storing unit reading out and storing of data from and in the storage unit, and a writing operation to the recording medium by the writing unit with respectively prescribed timings when these operations are executed.

The recording medium is recorded with data for which the recorded data is processed by the effects processings by means of the control unit controlling the effects unit performing the effects processings on data being an object for the reading out operation by the reading unit, the reading and storing control operations by the reading and storing control unit, and the writing operation to the recording medium by the writing unit when these operations are executed.

BRIEF DESCRIPTION OF THE DRAWINGS

FIG. 3 is a view illustrating a minidisc U-TOC;

FIG. 9A through FIG. 9E are views illustrating a jingle insertion operation of the embodiment; and FIG. 10A and FIG. 10B are views illustrating another jingle insertion operation of the embodiment.

DETAILED DESCRIPTION OF THE PREFERRED EMBODIMENTS

The following is a description of an embodiment of the present invention using FIG. 1 to FIG. 10B. In this example, a recording device is adopted using a magneto-optical disc known as a "mini-disc" as the recording medium. This description will be given in the following order.

1. Configuration of recording/playback device.

2. Mini-disc cluster format.

3. Mini-disc U-TOC structure.

4. Track re-production operation.

5. Making the effects track.

6. Various operations for other possible practical examples.

1. Configuration of Recording/playback Device

Figure 1:
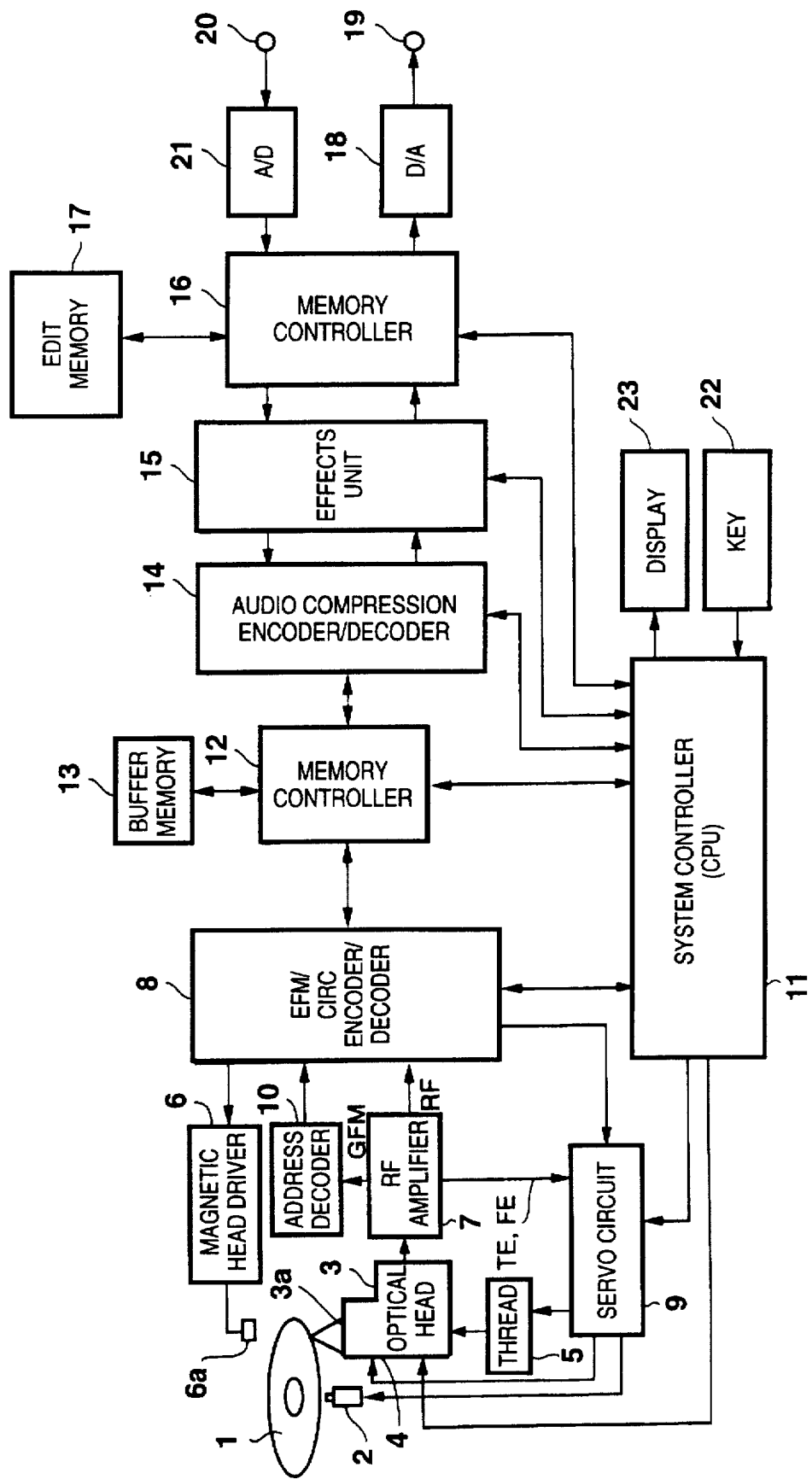
FIG. 1 is a block diagram showing an embodiment of a recording/playback device of the present invention.

FIG. 1 shows a block diagram of the essential parts of the recording/playback device of this example.

A magneto-optical disc 1 recorded with audio data is rotatably driven by a spindle motor 2, with the magneto-optical disc 1 being illuminated with laser light by an optical head 3 during recording and playback.

The optical head 3 outputs a high level laser light for heating the recording track to the Curie temperature and outputs a laser light of a comparatively low level for detecting data reflected back due to the magnetic Kerr effect during playback.

A laser diode constituting a laser output means, an optical system comprising a polarized beam splitter and object lens etc., and a detector are provided at the optical head 3. The object lens 3a can be displaced in the direction of the radius of the disc and towards and away from the disc and then held in position by a twin-axial mechanism 4.

Further, a magnetic head 6a is provided at a position opposite the optical head 3 so as to sandwich the magneto-optical disc 1. The optical head 6a applies a magnetic field modulated by the provided data to the magneto-optical disc 1.

The whole of the optical head 3 and the magnetic head 6a can be moved in the direction of the radius of the disc by a thread mechanism 5.

Information detected from the magneto-optical disc 1 by the playback operation with the optical head 3 is provided to an RF amplifier 7. The RF amplifier 7 then extracts an RF playback signal, a tracking error signal TE, a focus error signal FE and group information (absolute position information recorded on the magneto-optical disc 1 as pregrooves (wobbling grooves) GFM etc. by arithmetically processing the provided information.

The extracted RF playback signal is provided to an encoder/decoder 8. The tracking error signal TE and focus error signal FE are supplied to a servo circuit 9 and the group information GFM is supplied to an address decoder 10.

In the servo circuit 9, each of the various servo control signal, using the provided tracking error signal TE, focus error signal FE and the track jump instructions, access instructions and rotational velocity detection information for the spindle motor 2 from the system controller 11 comprising a microcomputer. The servo circuit 9 then controls the twin-axial mechanism 4 and the thread mechanism 5 so as to carry out focus and tracking control and controls the spindle motor 2 to be at a constant linear velocity (CLV).

The address decoder 10 decodes the provided group information GFM and extracts an address information. The address information is supplied to the system controller 11 and used in each of the various control operations.

The RF playback signal is EFM demodulated at the encoder/decoder 8 and also undergoes decode processing such as CIRC, with an address and subcode included in the RF playback signal as data also being extracted at this time and supplied to the system controller 11.

Audio data (sector data) that has undergone decode processing such as EFM decoding and CIRC at the encoder/decoder 8 is written to the temporary buffer memory 13 by the memory controller 12. Reading of data from the magneto-optical disc 1 by the optical head 3 and transmission of the playback data in the system from the optical head 3 and the temporary buffer memory 13 is at 1.41 Mbits/sec, but this is usually intermittent.

Data written in the temporary buffer memory 13 is read out when the transmission rate of the playback data becomes 0.3 Mbits/sec and supplied to the encoder/decoder 14. Playback signal processing such as decode processing for audio compression processing is then performed and the signal is then outputted as a 16-bit quantized, 44.1 kHz sampled digital audio signal.

During normal playback, this digital audio signal passes through an effects unit 15 and a memory controller 16 in a slew shape and is then provided to a D/A converter 18 and converted to an analog audio signal. The signal is then provided to a prescribed amplifier from an output terminal 19 played-back and outputted as, for example, left (L) and right (R) analog audio signals.

The effects unit 15 comprises, for example, a digital signal processor (DSP) and is constructed so as to subject the digital audio signal to the so-called "sound effects" such as echo, reverberation, equalization and fade-in/fade-out through arithmetic processing. When these sound effects are added to audio playback, the digital audio signal that has undergone the desired effects processing at the effects unit 15 is supplied to the D/A converter 18 and then outputted as an analog audio signal.

The memory controller 16 performs execution control of, for example, the reading and writing of digital audio signals to an edit memory 17 comprising, for example, a D-RAM etc.. During normal playback, the digital audio signal supplied via the effects unit 15 is outputted through the D/A converter 18 without modification, especially when it is not necessary for this signal to be written to the edit memory 17.

The memory controller 16 and the edit memory 17, as described in herein, are used when reproduction/processing is to be carried out on the data on the magneto-optical disc 1.

While the magneto-optical disc 1 is being recorded, the recording signal (analog audio signal) supplied at an input terminal 20 is converted to a 16 bit quantized 44.1 kHz sampled digital audio signal by the A/D converter 21 and then passes through the memory controller 16 and the edit memory 17 in a slew shape and is supplied to the encoder/decoder 14.

When it is desired to add sound effects to the audio signal to be recorded during this normal recording, it is preferable to output the digital audio signal to the encoder/decoder 14 after the desired processing has been carried out on the digital audio signal by the effects unit 15.

Further, when reproduction/processing etc. is to be carried out on data on the magneto-optical disc 1, data read from the edit memory 17 by the memory controller 16 is supplied to the encoder/decoder 14 via the effects unit 15, although this is to be described in detail later.

The encoder/decoder 14 performs audio compression encode processing on the supplied digital audio signal so as to make the amount of data one fifth of the original amount.

Recording data compressed by the encoder/decoder 14 is written to the temporary buffer 13 by the memory controller 12. The data is then read out in prescribed data units at a time when the amount of data accumulated in the temporary buffer memory 13 is greater than a prescribed amount and sent to the encoder/decoder 8. The data is then supplied to the magnetic head driver 6 after having undergone encode processing such as CIRC encoding and EFM modulation etc. at the encoder/decoder 8.

The magnetic head driver 6 then supplies the magnetic head driver signal to the magnetic head 6a in response to the encode-processed record data. Namely, the magneto-optical disc 1 is subjected to North and South magnetic fields by the magnetic head 6a. Further, the system controller 11 supplies a control signal at this time in such a manner that recording level laser light is outputted to the optical head.

A recording operation is then intermittently carried out with respect to the audio signal continuously inputted at the input terminal 20 via the temporary buffer memory 13.

Various keys are provided at an operation part 22 for user operations, including, for example, a record key, a playback key, a pause key, an AMS key, a fast-forward key and a high-speed rewind key, and the operation information is provided to the system controller 11. Operation keys are also provided for the execution of processes such as reproduction/processing to be described later with respect to this recording/playback device.

A display 23 comprises, for example, a liquid crystal display and displays the operating conditions, track number and time information etc. based on the control of the system controller 11.

While a recording/playback operation is being carried out with respect to the magneto-optical disc 1, it is necessary for the management information recorded on the magneto-optical disc 1, i.e. the P-TOC (pre-mastered TOC) and the U-TOC (user TOC) to be read. The system controller 11 then identifies the address of the area to be recorded and the address of the area to be played-back in the magneto-optical disc 1 in response to this management information, with this management information being stored in the temporary buffer memory 13. Because of this, the temporary buffer memory 13 sets the buffer area for recording and playing-back data and the area for storing the management information to be divided.

The system controller 11 then reads out this management information by executing the playback operation for the innermost periphery of the disc recorded with the management information, records this data in preparation in the temporary buffer memory 13 and then refers to this information while recording to and playing back from the magneto-optical disc 1 thereafter.

This U-TOC can be edited and re-written in response to the recording and erasing of data. The system controller 11 carries out these editing processes for the recording and playback with respect to the U-TOC information stored in the temporary buffer memory 13 and also re-writes the U-TOC of the magneto-optical disc 1 at a prescribed time in response to this re-writing operation.

2. Minidisc Cluster Format

Figure 2:
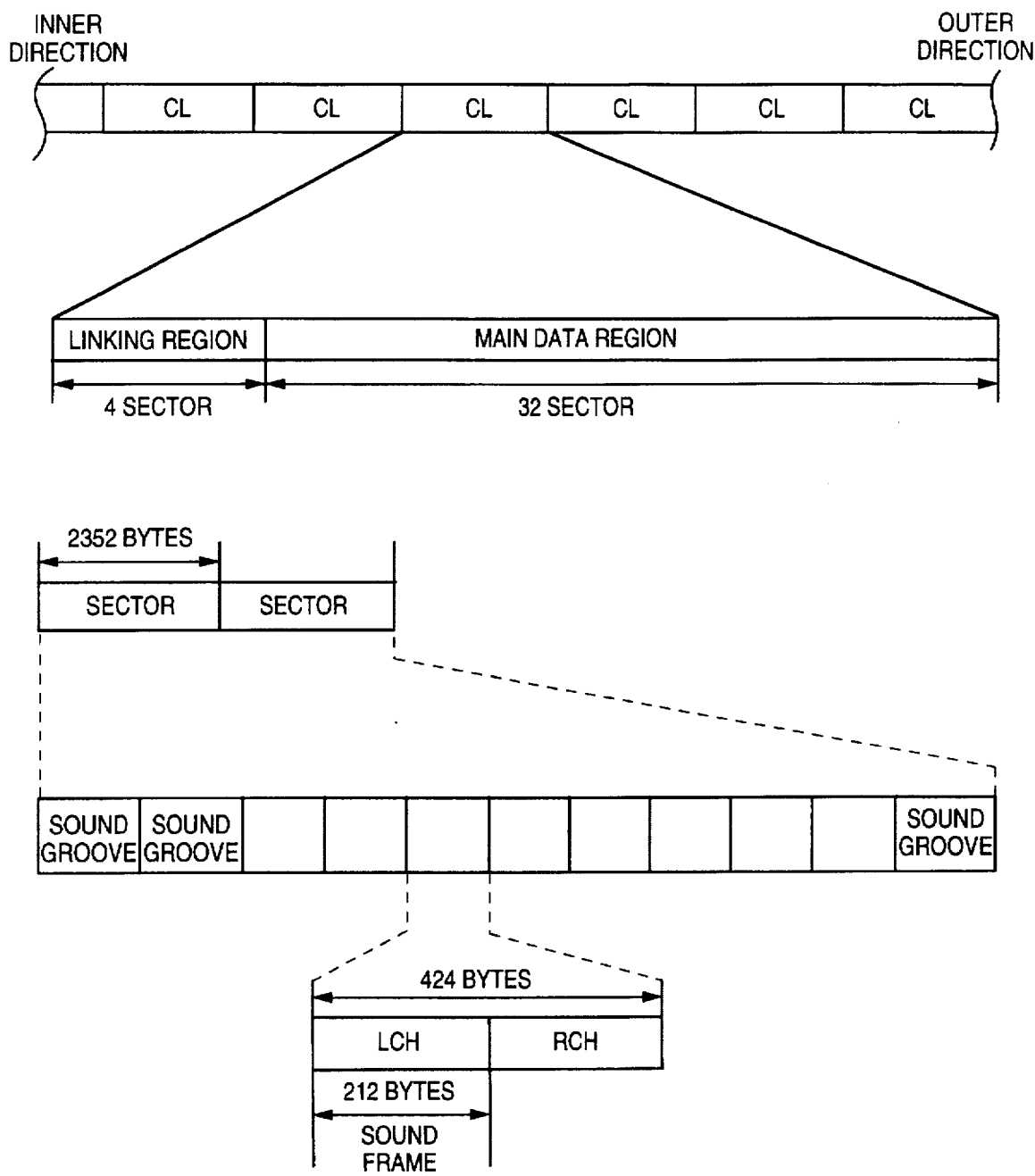
FIG. 2 is a view illustrating a minidisc cluster format.

The minidisc cluster format will be described using FIG. 2.

The recording operation in the minidisc system is carried out in units known as clusters. A cluster CL is then continuously formed in the manner shown in FIG. 2 as the recording track at the minidisc with one cluster being the smallest unit at the time of recording. One cluster corresponds to a track portion of two to three rotations.

One cluster CL comprises a four sector linking region and a 32 sector main data region, with one sector comprising 2352 bytes.

A four sector linking region is used for sub-data and as a linking area etc. with the recording of the audio data and TOC data etc. carried out at a 32 sector main data region.

The sector is then further divided into units known as sound groups, with two sectors being divided into 11 sound groups. One sound group comprises 424 bytes of audio data corresponding to a time of 11.61 msecs.

Data within one sound group is recorded so as to be divided up every 212 bytes between the left (L) and right (R) channels, respectively.

Here, 212 bytes comprising a data region for an L channel or a R channel are referred to as a sound frame.

3. Minidisc U-TOC Structure

As described above, the system controller 11 reads out the P-TOC and U-TOC (user TOC) recorded on the magneto-optical disc 1 as management information while recording to or playing back from the magneto-optical disc 1 and then refers to this data.

Here, a description is given of a U- TOC sector as management information for carrying out management of the recording/playback operations etc. for tracks (pieces of music, etc) of the magneto-optical disc 1.

A U-TOC and a P-TOC are provided as TOC information but the P-TOC is formed at a pit area at the innermost periphery of the magneto-optical disc 1 and is read-only information. Management of the position etc. of the recordable areas of the disc (recordable user area), the read-out areas and the U-TOC areas etc. is carried out by the P-TOC.

It is also possible to use playback dedicated discs where all of the data is recorded using pit-shapes but in the case of playback-dedicated discs, management of song recorded in ROM form is carried out by the P-TOC and a U-TOC is not formed. A detailed description of a P-TOC is omitted and a description is given of a U-TOC for a recordable magneto-optical disc.

FIG. 3 shows a U-TOC sector format. Sector 0 to sector 7 can be provided as the U-TOC sector but sector 1 and sector 4 are taken as areas for character information and sector 2 is taken as an area for recording the day and time of recording. A description is only given here of the U-TOC sector 0 essential in recording and playing back the magneto-optical disc.

The U-TOC sector 0 is mainly a data region recorded with management information for a free area that can be recorded with pieces of music recorded by the user or new pieces of music.

For example, while the recording of a certain song on the magneto-optical disc 1 is being carried out, the system controller 11 searches for a free area on the disc from the U-TOC sector 0 and records data at this place. Further, during playback, the area recorded with the song to be played back is determined from the U-TOC sector 0, this area is accessed, and the playback operation is carried out.

The leading position of the data region (4 bytes×588, giving 2352 bytes) for the U-TOC sector 0 is recorded with a synchronization pattern comprising one byte of data of all zeros or all ones in a line.

Next, four bytes are added for an address comprising a cluster address (Cluster H) (Cluster L) and a sector address (Sector) along with mode information (MODE), with the above thus forming a header.

A sector, as described above, is a 2352 byte data unit, with 36 sectors comprising one cluster. The synchronization pattern and address are not limited to being recorded at this U-TOC and this sector unit can also be recorded at the P-TOC sector or at a data sector where audio data is actually recorded.

The cluster address is recorded using two bytes of an upper address (Cluster H) and a lower address (Cluster L) and the sector address (Sector) is recorded using one byte.

Next, data for a maker code, model code, first track number (First TNO), track number of final track (Last TNO), conditions of use of sectors (Used sectors), disc serial number and disc ID etc. is recorded at a prescribed byte position.

Further, a region recorded with various table pointers (P-DFA, P-EMPTY, P-FRA, P-TN01 to P-TN0255) constituting corresponding table pointer data for performing identification by making regions for tracks (pieces of music, etc.) recorded by the user and free areas etc. correspond to a management table to be described later is prepared.

Next, a 255 item parts table (01h) to (FFh) constituting the management table corresponding to the table pointers (P-DFA to P-TN0255) is provided. Start addresses that are the beginning of certain parts and addresses that are the ends and mode information (track mode) for these particular parts are recorded at the respective parts tables. Link information is also recorded showing the parts tables recorded with the start addresses and end addresses of linked parts because there are also cases where parts shown in each of the parts tables are linked to other parts.

In this specification, numbers with "h" attached are so-called hexadecimal numbers. Further, "parts" refers to track portions where data that is continuous with respect to time is recorded in physical succession.

With this kind of recording device, data for one song is not recorded in a continuous manner, i.e. a playing back operation where playing back is carried out while accessing between parts does not provide a problem even when a plurality of parts are recorded in a dispersed manner. There are therefore also cases where a plurality of parts for pieces of music recorded by the user etc. are recorded so as to be split-up in order to ensure efficient use of the recordable area.

Link information is therefore provided because of this, and parts tables can then be linked by pointing to the parts tables to be linked by, for example, giving numbers (01h) to (FFh) to each of the parts tables.

Namely, at the management table occurring at U-TOC sector 0, one parts table expresses one part and for example, with a song comprising three linked parts, parts position management is achieved using three parts tables linked using link information.

In reality, the link information is shown by a numerical value giving a byte position within the U-TOC sector arrived at by arithmetic processing. Namely, a parts table given by 304+(link information)×8 (byte number) is pointed to.

Each of the parts tables (01h) to (FFh) occurring at the management table of the U-TOC sector 0 indicate the contents of these parts using table pointers (P-DFA, P-EMPTY, P-FRA, P-TN01 to P-TN0255) occurring at the corresponding table pointer data parts in the way shown in the following.

The table pointer P-DFA shows defective areas on the magneto-optical disc 1 and points to the top of the parts table of the one or a plurality of parts tables indicated as track portions (=parts) comprising regions that are defective due two, for example, scratches. Namely, when a defective part exists, this is recorded in whichever of (01h) to (FFh) of the table pointer P-DFA, with the start and end address of the defective part being shown at the corresponding parts table. Further, when another defective part also exists, the other parts table is pointed to as link information occurring in this parts table, with defective parts also being shown in this parts table. When a further defective part does not exist, the link information is, for example, put to be "(00h)" and it is taken that there are no links thereafter.

The table pointer P-EMPTY shows the top parts table of one or a plurality of un-used parts tables occurring in the management table. When an un-used parts table exists, one of (01h) to (FFh) is recorded as the table pointer P-EMPTY. When a plurality of un-used parts tables exist, a sequence of parts tables is pointed to by the link information from the parts table pointed to by the table pointer P-EMPTY and all of the un-used parts tables are linked on the management table.

The table pointer P-FRA shows the free areas (including erased regions) on the magneto-optical disc 1 that can be recorded with data and points to the top of the parts table of one of the plurality of parts tables shown to be the track portion (=parts) comprising free areas. When a free area exists, one of (01h) to (FFh) is recorded with the table pointer P-FRA and the start and end address of the part constituting the free area is shown at the corresponding parts table. When a plurality of this kind of parts exist, sequential pointing is carried out until the parts table for which the link information is "(00h)" is reached using the link information.

Figure 4:
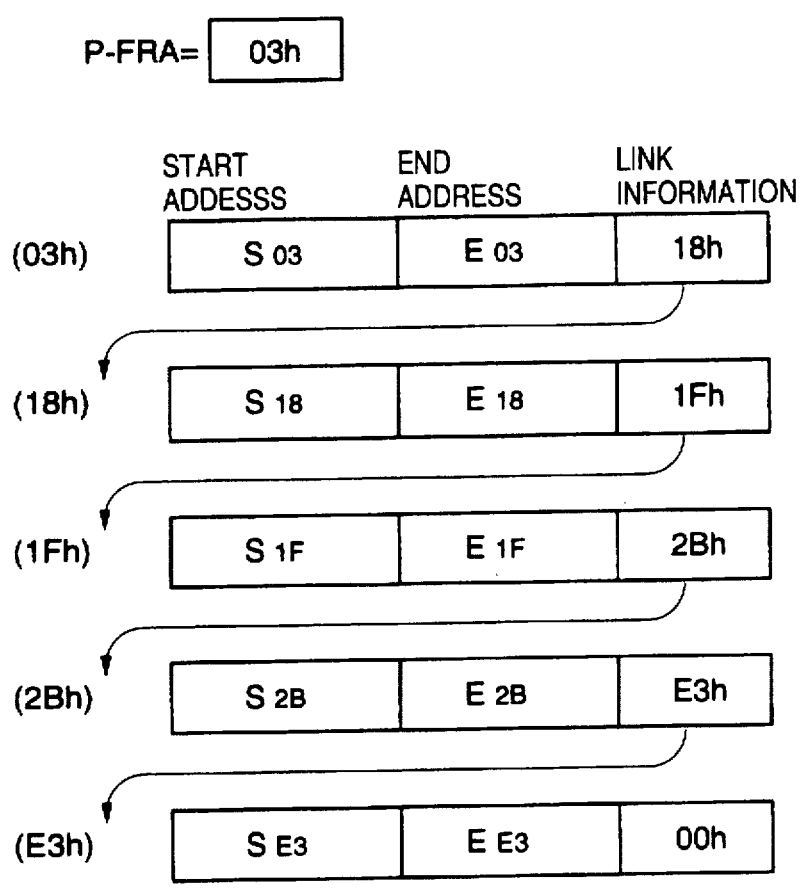
FIG. 4 is a view illustrating linking conditions for a minidisc U-TOC.

FIG. 4 is a schematic view showing the management conditions of the parts comprising the free area employing the parts tables. When the parts (03h) (18h) (1Fh) (2Bh) and (E3h) are taken as the free area, the conditions are shown that express the linking of the parts tables (03h), (18h), (1Fh), (2Bh) and (E3h) following the corresponding table pointer data P-FRA. The same is also true for the management conditions for defective regions and un-used parts tables.

If the magneto-optical disc is not recorded with any audio data such as pieces of music etc. at all and does not have any defects, the parts table (01h) is pointed to by the table pointer P-FRA and the whole of the recordable user area of the disc is shown to be the free area. The parts table (02h) is then pointed to by the aforementioned table pointer P-EMPTY and the parts table (03h) is pointed to as the link information for the parts table (02h) . . . so as to link down as far as the parts table (FFh) because in this case the remaining parts tables (02h) to (FFh) are not used. In this case, the link information for the parts table (FFh) is taken to be "(00h)" so as to show that there are no links thereafter.

At this time, the start address of the recordable user area is recorded as the start address at the parts table (01h) and the address directly before the lead-out start address is recorded as the end address.

The table pointers P-TN01 to P-TN0255 show tracks such as pieces of music etc. recorded on the magneto-optical disc 1 by the user with, for example, the table pointer P-TN01 pointing to the parts table showing the part at the head with respect to the time of the one or plurality of parts recorded for the first track.

For example, when a track for the song taken to be the first track is not divided up on the disc and is recorded as one part, the recording region for this first track is recorded as the start and end address occurring at the parts table shown by the table pointer P-TN01.

When the song taken, for example, as the second track is recorded in such a manner as to be dispersed between a plurality of parts on the disc, each of the parts are pointed to in order to show the position of recording of the second track so as to be temporarily sequential. Other parts tables are then pointed to sequentially with respect to time by the link information, from the parts table pointed to by the table pointer P-TN02 and linking operation is carried out as far as the parts table for which the link information is "(00h)" (the same as the situation for FIG. 4 in the above).

By sequentially designating and then recording all of the parts for data comprising, for example, the second song, using data for this U-TOC sector, sequential music information can be picked out from dispersed parts accessed by the optical head 3 and the magnetic head 6 while playing back the second song or overwriting to the region for the second song and recording that efficiently uses the recording area can be carried out.

As described above, with the re-writable magneto-optical disc 1, the recorded pieces of music (tracks) and free areas etc. are handled by the U-TOC.

Further, by forming the U-TOC in this manner and then rewriting the table pointer value and the parts table contents, one track can be, for example, divided into two tracks or two tracks can be linked together to form one track without having to do anything to the actual data on the disc and editing such as changing the track number so as to change the order in which the pieces of music are played back can be carried out in a simple manner.

4. Track Reproducing Operation

The following is a description of a special operation for executable reproduction/processing in this example.

The dividing, linking and moving of tracks recorded in the magneto-optical disc 1 can be carried out by re-writing the contents of the U-TOC in the above manner. However, the reproduction of tracks having the same audio contents as certain tracks recorded on the magneto-optical disc 1 or the generation of tracks where audio data for a certain track recorded on the magneto-optical disc 1 is subjected to prescribed effects processing is not possible. Therefore, in this example these kinds of special operations that are not compatible with U-TOC editing are realized using an edit memory 17.

Figure 5:
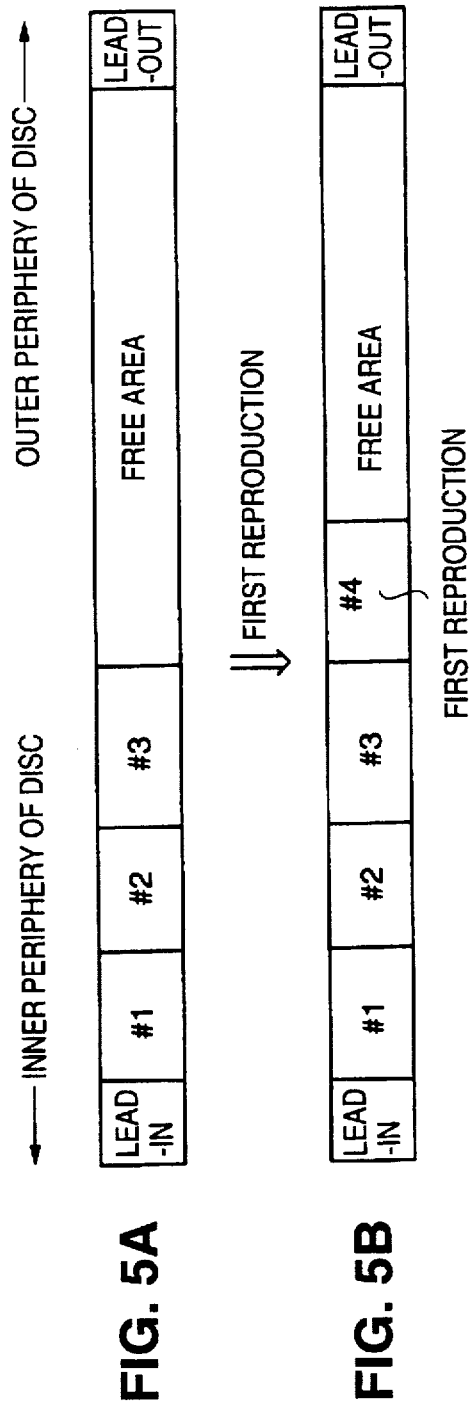
FIG. 5A and FIG. 5B are views illustrating a track reproduction operation of the embodiment.
Figure 6:
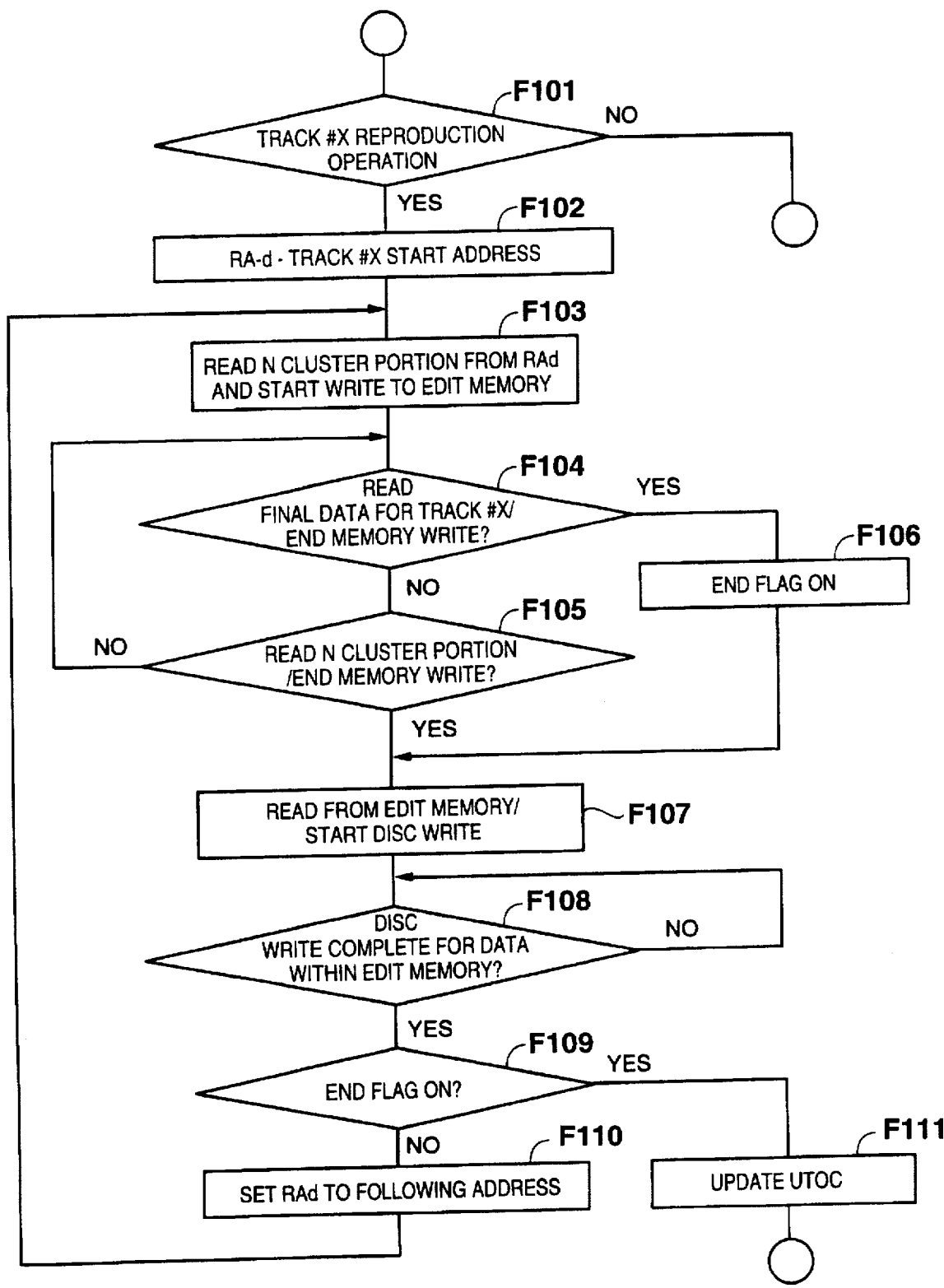
FIG. 6 is a flowchart of a track reproduction operation for the embodiment.

First, the process for the track reproduction operation is described using FIG. 5 and FIG. 6.

FIG. 5 is a schematic view showing a process referred to as track reproduction. As shown in FIG. 5A, three pieces of music are recorded on the magneto-optical disc 1 as tracks #1 to #3, with the remaining area being taken as a free area.

When the user wishes to reproduce the song for track #1 and designates track #1 from the operation part 22 so as to carry out the operation for executing the reproduction operation, the system controller 11 carries out the process shown in FIG. 6 and the reproduction operation is executed.

As a result, as shown in FIG. 5B, audio data (song) having the same contents as track #1 shown in FIG. 5B is recorded as track #4 so that track #1 is reproduced.

The process of FIG. 6 executed by the system controller 11 for track reproduction will now be described.

In step F101, the system controller 11 looks for the user reproduction operation. When the user designates a certain track (track #x) so as to carry out an operation to execute an intended reproduction, the process proceeds to step F102 and the start address for track #x is set to the variable RAd constituting the data reading start position pointer from the magneto-optical disc 1. This start address is a value listed corresponding to each track at the U-TOC sector 0.

In the case of this example, looking at the compressed audio data recorded on the magneto-optical disc 1, it is assumed that the edit memory 17 is equipped with storage for N cluster portions. As can be seen from FIG. 1, audio data stored at the edit memory 17 is 16-bit quantized compressed data sampled at a frequency of 44.1 kHz. The storage capacity of the edit memory 17 is therefore about five times the amount for N cluster portions.

In step F103, the system controller 11 makes the optical head 3 access the address set as the data read start position pointer RAd and reading from the magneto-optical disc 1, i.e. reading from track #x starts.

The data read is then put into the form of 16-bit, 44.1 kHz quantized digital audio signal by undergoing each of the processes at the encoder/decoder 8, the memory controller 12, the temporary buffer memory 13 and the encoder/decoder 14, and is then supplied to the memory controller 16. The memory controller 16 then writes this digital audio signal to the edit memory 17.

Since the edit memory 17 has a storage capacity equal to N clusters on the magneto-optical disc 1, the reading out from the magneto-optical disc 1 is once stopped when reading out of N clusters of data from the data read start position pointer RAd and the writing to the edit memory 17 are finished.

This is to say that the process goes from step F105 to step F107. Then, in step F107, the digital audio signal written to the edit memory 17 by the memory controller 16 is sequentially read-out, a recording mode operation is executed at the encoder/decoder 14, memory controller 12, temporary buffer memory 13 and encoder/decoder 8, and a data recording operation to the free areas of the magneto-optical disc 1 is carried out by the optical head 3 and the magnetic head 6.

Namely, the digital audio signal read-out from the edit memory 17 undergoes processes such as compression processing and EFM modulation etc. in the same way as the case for recording audio signals inputted form the usual input terminal 20 and is then recorded to the free areas of the magneto-optical disc 1.

If all of the data stored in the edit memory 17 has been read-out and recorded on the magneto-optical disc 1, step F109 is proceeded to from step F108 to determine whether the end flag is on, and step F110 is then further proceeded to if the end flag (to be described later) is not on. The value of the data read start position pointer RAd is then set to the address following the address of the data read out finally in the reading operation from the magneto-optical disc 1 started in step F103 of the previous process cycle. Step F103 is then returned to and the reading out of data from the data read start position pointer RAd starts again. Namely, an operation constituting playback mode is again executed at the encoder/decoder 8, the memory controller 12, the temporary buffer memory 13 and the encoder/decoder 14, the optical head 3 is made to access the address shown by the data read start position pointer RAd and the reading out of data continuing on from the previous read is started.

The process for step F103 to step F110 is then repeated. However, when the data read by the read operation from step F103 and written to the edit memory 17 is data for the address that is the final address for track #x (the end address for track #x (the end address of the final part when track #x comprises a plurality of parts), the process goes from step F104 to F106 and the end flag is put to "on".

In step F107, the operation of reading data written to the edit memory 17 and the operation of recording to the magneto-optical disc 1 are carried out. A confirmative result is outputted in step F109 when all of the digital audio data within the edit memory 17 is written to the magneto-optical disc 1 and the recording operation is complete. The loop from step F103 to F110 is then terminated and the playing back of/recording of data from/to the magneto-optical disc 1 is complete. At this point, the audio data for track #x has been reproduced at another track. However, re-writing of this U-TOC data has to be carried out in accompaniment with this track reproduction recording operation such that a U-TOC updating process is carried out in step F111 and the sequence for the track reproducing operation is complete. As a result of this process, the reproduced track can be managed as an independent track with a certain track number and the conditions shown in FIG. 5B can be realized.

In the kind of example described above, when it is wished to reproduce a certain track recorded on the magneto-optical disc 1, it is no longer necessary to carry out the troublesome process of connecting another recording/playback device and perform a dubbing operation, and a reproduced track can be easily made on the same disc.

5. Making the Effects Track

The operation of making an effects track where a track that has undergone prescribed effects processing is generated for an audio track constituting a certain track recorded on the magneto-optical disc 1 is described using FIG. 7A through FIG. 7D and FIG. 8.

Figures 7A, 7B, 7C, 7D:
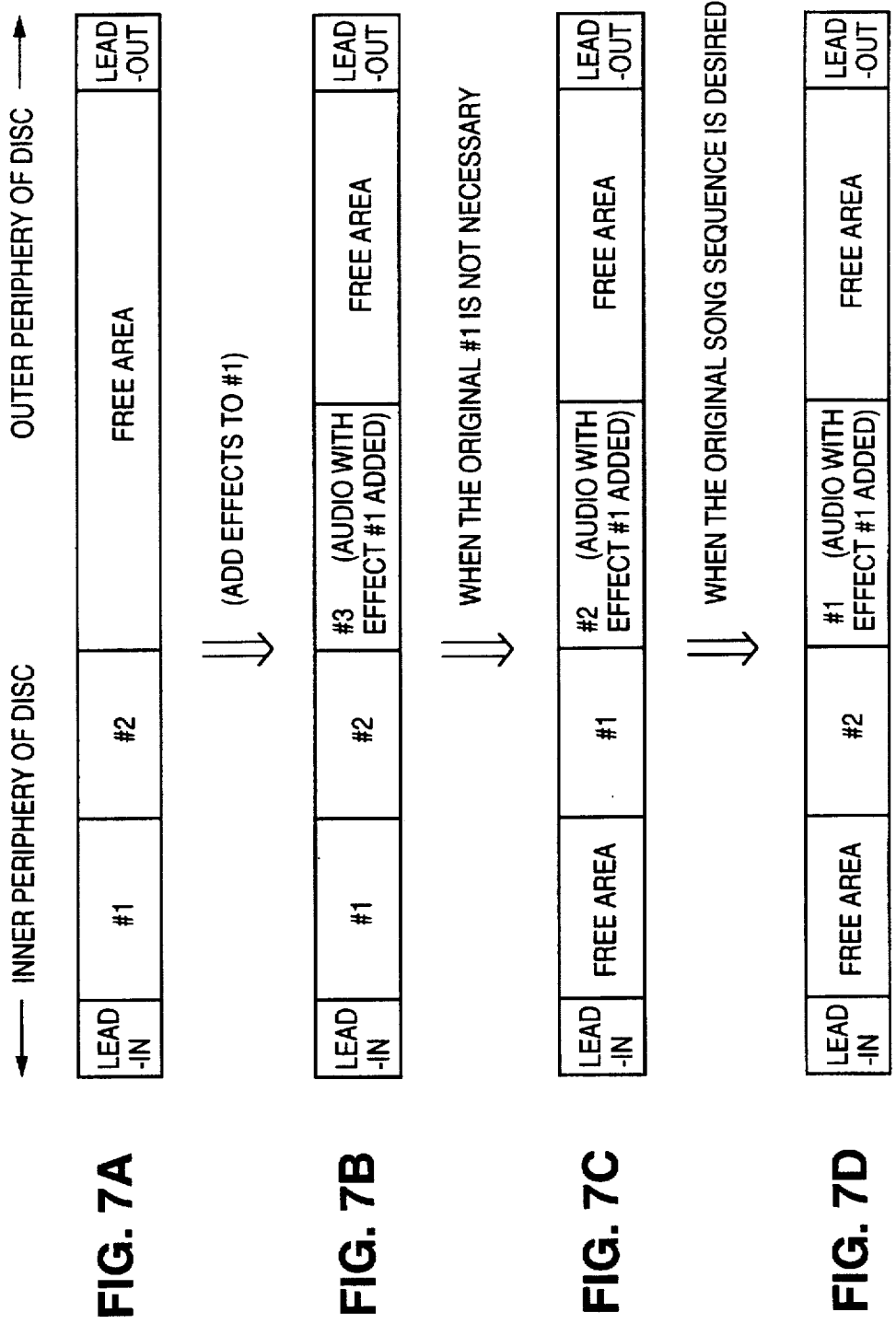
FIG. 7A through FIG. 7D are views illustrating an effects track making operation of the embodiment.

FIG. 7A and FIG. 7B are schematic views showing the effects track making process. As shown in FIG. 7A, two pieces of music are recorded on the magneto-optical disc 1 as tracks #1 and #2, with the remaining area being taken to be a free area.

Figure 8:
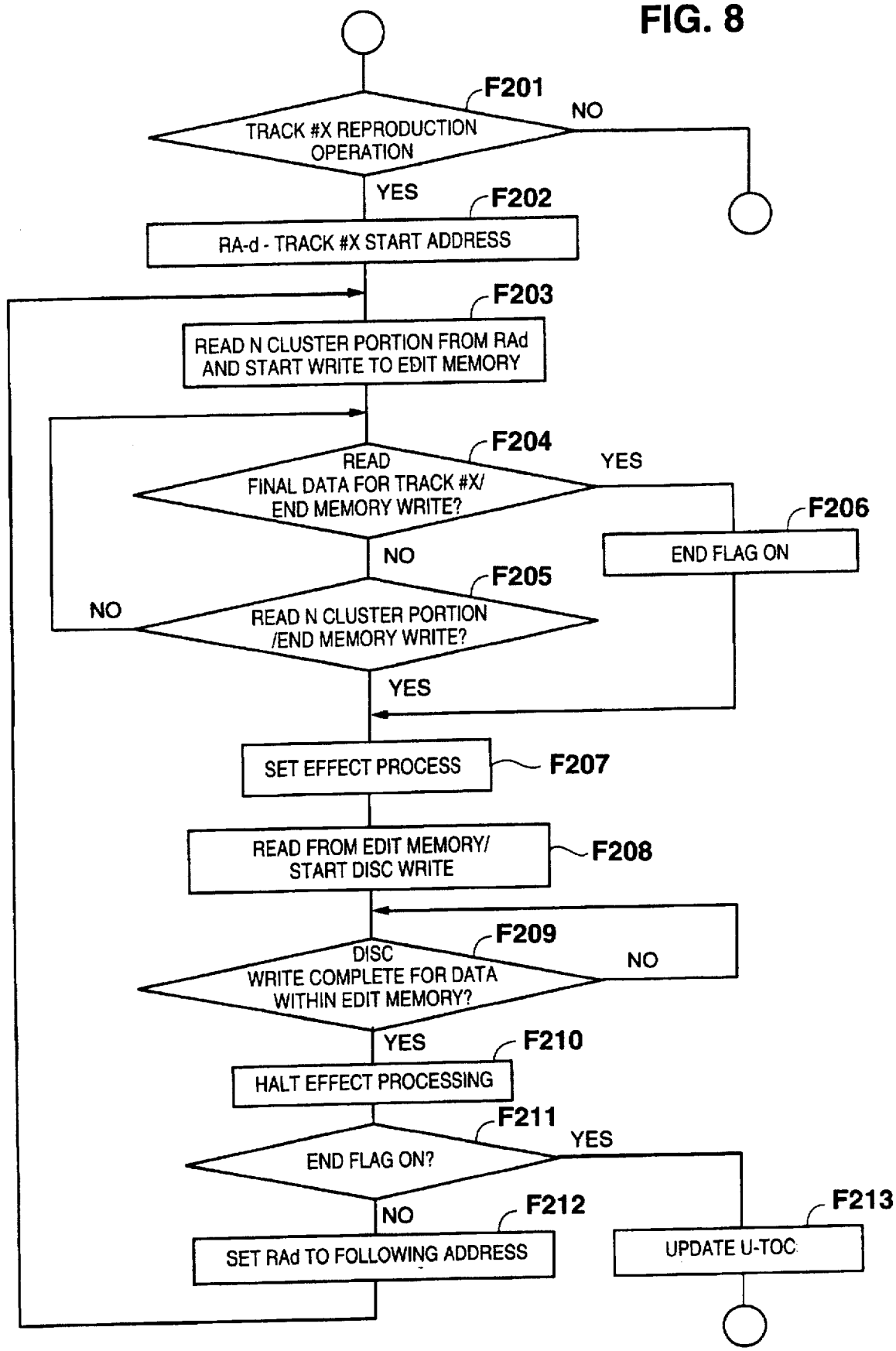
FIG. 8 is flowchart of an effects track making operation of the embodiment.

When a user then wishes to generate a track with audio effects such as equalization applied to the song of track #1, track #1 is designated from the operation part 22, an operation to execute the making of an effects track is carried out and the system controller 11 carries out the process shown in FIG. 8 so as to execute an operation for making the effects track.

As a result, at the magneto-optical disc 1, audio is present having the same contents as track #1, as shown in FIG. 7B but data for the audio with sound effects such as equalization added is also recorded at the track #3.

The process of FIG. 8 executed by the system controller 11 in order to make the effects track will now be described.

In step F201, the system controller 11 first looks for user operations. The process then proceeds to step F202 when the user designates a certain track (track #x) in order to carry out execution of an operation to make an effects track. It is then obviously necessary for the user to perform operations to designate the type of effects to be executed (equalization, echo, reverberation, fade-in/fade out etc.) and set the level of these effects.

Proceeding to step F202, the system controller 11 first sets the start address for track #x to the variable RAd constituting the data read start position pointer RAd from the magneto-optical disc 1.

Then, in step F203, the optical head 3 is made to access the address to which the data read start position pointer RAd is set and reading from the magneto-optical disc 1 is started, i.e. reading of track #x commences. The process in step F203 to F205 is the same as the process in step F103 to F105 of FIG. 6, with an N-cluster portion of data being read and written to the edit memory 17.

The operation of reading once from the magneto-optical disc 1 then ends at the time when N clusters of data are read from the data read start position pointer RAd and written to the edit memory and the process proceeds from step F205 to step F207. The system controller 11 exerts control here in such a manner that effects operations set by the user for the effects unit 15 are then executed.

Then, in step F208, the digital audio signal written to the edit memory 17 by the memory controller 16 is sequentially read-out, the operations for recording mode are executed at the encoder/decoder 14, the memory controller 12, the temporary buffer memory 13 and the encoder/decoder 8, and the recording of data to the free areas of the magneto-optical disc 1 is carried out by the optical head 3 and the magnetic head 6.

At this time, the effects processes occurring at the edit memory 17 are executed and the audio signal read out from the edit memory 17 is therefore supplied to the encoder/decoder 14 as the effects processed audio data.

The digital audio signal read-out from the edit memory 17 also undergoes processing such as compression processing and EFM modulation as sound effects processing and is then recorded to the free area of the magneto-optical disc 1.

When all of the data stored in the edit memory 17 is read and recorded at the magneto-optical disc 1, the process goes from step F209 to step F210 and the effects processing occurring at the effects unit 15 is halted i.e. the effects unit 15 is passed through.

If the end flag is not on in step F211, step F212 is proceeded to and the value for the data read start position pointer RAd is set to be the address following the address of the data read finally in the operation for reading from the magneto-optical disc 1 started at in step F203 the previous processing cycle. Step F203 is then returned to and data reading is started again from the data read start position pointer RAd. Namely, the encoder/decoder 8, memory controller 12, temporary buffer memory 13 and encoder/decoder 14, are again made to execute the operations as playback mode, together with the optical head 3 made to access the address shown by the data read start position pointer RAd and to start reading out of data continued from the previous one.

The process for step F203 to step F212 is then repeated. However, when the data read by the read operation from step F203 and written to the edit memory 17 is data for the address that is the final address for track #x (the end address for track #x (the end address of the final part when track #x comprises a plurality of parts), the process goes from step F204 to F206 and the end flag is put to "on".

Confirmative results are then outputted in step F211 when the data read from the edit memory 17 has undergone effects processing in the process in step F207 to F210 so that the operation of recording to the magneto-optical disc 1 is complete. The loop from step F203 to F212 is then escaped from and the operation of playing back/recording data from/to the magneto-optical disc 1 is complete. At this time, an audio track with audio data that has been subjected to sound effects has been made for the audio data for track #x. However, re-writing of this U-TOC data has to be carried out in accompaniment with this recording operation, and a U-TOC updating process therefore has to be carried out in step F213 so that the sequence for the operation of making the effects track is complete. As a result of this updating process, the track formed can be managed as an independent track with a certain track number and the conditions shown in FIG. 7B can be realized.

In this example, the troublesome operation of connecting another recording/playback device or effects device and performing a dubbing operation in order to make an audio data track for a particular audio track recorded on the magneto-optical disc 1 that has undergone the required sound processing can now be made in a simple manner on the same disc.

When the original audio data for track #1 is no longer necessary when the kind of effects track #3 shown in FIG. 7B is made, track #1 can be erased simply by editing the U-TOC. In this manner, as shown in FIG. 7C, the region for track #1 is made to be a free area, track #2 is made to be track #1, and effects track #3 is made to be track #2.

Further, if the U-TOC is to be edited so that the song order of the first track #1 and the effects track #2 in FIG. 7C is changed over (so that the song numbers are changed over), as shown in FIG. 7D, management conditions are adopted where the effects track becomes track #1.

If track #1 of FIG. 7A is taken to be song A and track #2 is taken to be song B, then track #3 of FIG. 7B is then the effects processed song A.

Considering the normal playback operation, in the situation in FIG. 7A, playback is in the order of song A and then song B. However, by editing as far as the situation in FIG. 7D, playback can be carried out in the sequence of the effects processed piece of music A, and piece of music B using the usual playback operation, that is, the effects tracks are played back in the same sequence as before the tracks are effects processed.

Further, as an operation for making the effects track, the conditions in FIG. 7B are not stopped and an editing process going as far as the situation in FIG. 7B after the making of the effects track can be executed automatically by the system controller 11.

6. Other Possible Operations

Next, a description is given of various other types of operations that are possible other than track reproduction and making of an effects track.

First, the insertion of jingles between each of the tracks recorded on the magneto-optical disc 1 is possible.

As shown in FIG. 9A, it is taken that three pieces of music of tracks #1 to #3 are recorded on the magneto-optical disc 1. When it is wished to inset jingles such as certain short pieces of music between each of the pieces of music, the user stores the audio data for the jingles in the edit memory 17 beforehand, i.e. the system controller 11 prepares the operating mode for inserting sound. In this mode, audio inputted via the input terminal 20 is taken in by a region of the edit memory 17.

Then, when the insertion of a jingle is designated, the system controller 11 carries out almost the same operation with respect to each of the pieces of music recorded on the magneto-optical disc 1 as for the aforementioned reproduction (or effects track making) operation, with the jingle audio data stored in the edit memory 17 being read out and recorded on the magneto-optical disc 1 at the time of shifting from the reproduction of one song to the reproduction of the next song. Jingle audio Z can then be inserted at the boundary portions of each of the reproduced tracks (#4 to #6) shown in FIG. 9B by repeating this kind of operation.

What is known as "cross-fading", where changeover is achieved while the music is playing back, can then be achieved if fade-in/fade-out processing is carried out on the reproduced track data and fade-in/fade-out effects processing is also carried out on the jingle at this time.

This jingle audio Z can also be incorporated as part of a reproduced track as shown in FIG. 9B through FIG. 9E or can also be managed as an independant track.

Moreover, when the kind of jingle insertion shown in FIG. 9B is carried out, if the original tracks #1 to #3 become unnecessary, these can be erased by editing the U-TOC so as to give the kind of situation shown in FIG. 9C.

It is not, however, always necessary to carry out track reproduction when jingles are inserted. Namely, when it is wished to insert jingles between each of the tracks of FIG. 9A, the track constituting the jingles can be repeatedly recorded only by a number of times equal to the number of intervals between the pieces of music. In FIG. 9A there are three pieces of music and therefore two intervals between pieces of music. The operation of reading the jingle audio from the edit memory 17 and recording this to the magneto-optical disc 1 is therefore carried out to times, so as two make the tracks (#4 and #5) for the two jingles Z shown in FIG. 9D. Then, when the U-TOC is updated after recording, the track numbers are replaced at the same time so that the original track numbers #1, #2 and #3 become track numbers #1, #3 and #5 and the jingle tracks become track #2 and track #4 as shown in FIG. 9E.

Jingle audio is therefore played back between each of the pieces of music at the time of playback.

FIG. 10 shows an operation for inserting a jingle between pieces of music when an audio signal from another device is inputted at the input terminal 20 in FIG. 1 and recorded on the magneto-optical disc 1. The jingle audio is stored in the edit memory 17 beforehand.

In this case, it is desirable to repeat the process of the system controller 11 recording the inputted audio to the magneto-optical disc 1 and then reading the jingle audio from the edit memory 17 when the inputted song changes and also recording this jingle audio on the magneto-optical disc 1.

When another equipment, a compact disc player, for example, is integrally included as part of the structure of FIG. 1, changing of the inputted piece of music can be known from the playback conditions (track number) on the side of this compact disc player. Further, although this is not shown in FIG. 1, when a digital audio interface is provided and digital audio data is inputted from other equipment, the digital audio data and transmitted track number can simply be monitored. Moreover, in the case of analog input, intervals can be determined by when the signal is silent.

Further, audio signals to be recorded can also be inputted at jingle insertion periods because audio signals inputted from external equipment are inputted continuously. In this case, a process can be carried out where the inputted audio signal is temporarily stored in the edit memory 17.

Various operation examples have been described in the above, but a wide range of operations are possible by providing the edit memory 17 of this example.

Further, an example was given where the present invention is applied to a minidisc system but the present invention can also be applied to various other recording/playback devices.

In the recording/playback device of the present invention described above, storage means capable of storing data read out by reading means is provided. A control means then controls the operations of a reading means reading out from a recording medium, writing to and reading from the storage means and a writing means writing to the recording medium in such a manner that these operations occur at prescribed times. The reproduction and processing (effects processing) of data that has usually not been possible without using recording/playback devices is now possible using only one recording/playback device making the scale of the devices necessary smaller and the operation for the execution procedure easier.

In particular, useful functions such as the reproduction of data groups such as pieces of music in the form of tracks on a recording medium or the generation of tracks with effects added can be achieved.

What is claimed is:

1. A recording and reproducing apparatus for recording or reproducing data from a recording medium, the recording medium having a program area and a management area, the recording and reproducing apparatus comprising:

reproducing means for reproducing pre-recorded compressed data from a recording medium having a management area;

first memory means for storing the reproduced compressed data by the reproduced means;

first memory control means for controlling read-out operation from and write-in operation to the first memory means;

expanding means for expanding the compressed data readout from the first memory means;

effects means for performing prescribed effects processing on the expanded data from the expanding means;

second memory means for storing the effects processed expanded data from the effects means;

second memory control means for controlling the read-out operation from and the write-in operation to the second memory means;

compressing means for compressing the effected expanding data read out from the second memory means;

recording means for recording the compressed data in an area different from an area where original compressed data has been recorded; and editing means for editing the management area to re-number a program number.

2. The recording and reproducing apparatus of claim 1 wherein the editing means edits the management area to erase the pre-recorded compressed data and to re-number the program number.

3. A recording and reproducing method for recording or reproducing data from a recording medium, the recording medium having a program area and a management area, the recording and reproducing method comprising the steps of:

reproducing a pre-recorded compressed data from a recording medium having a management area;

storing the reproduced compressed data to a first memory by a reproducing head;

controlling read-out operation from and write-in operation to the first memory;

expanding the compressed data read out from the first memory;

performing prescribed effects processing on the expanded data from an expander;

storing the effects processed expanded data from said effects means to a second memory;

controlling read-out operation from and write-in operation to the second memory;

compressing the effects processed expanded data read out from the second memory;

recording the compressed data in an area different from an area where original compressed has been recorded; and editing the management area to re-number a program number.

4. The method of claim 3 wherein said step of editing includes erasing the pre-recorded compressed data and re-numbering the program number.

* * * * *

UNITED STATES PATENT AND TRADEMARK OFFICE
CERTIFICATE OF CORRECTION

PATENT NO.   : 5,761,173
DATED        : June 2, 1998
INVENTOR(S)  : HIRAKU INOUE It is certified that error appears in the above-identified patent and that said Letters Patent is hereby corrected as shown below:

In Col.1 line 15, please change "developed" to --developed,--;

In Col.1, line 31, please change "Then" to --Then,--;

In Col.9, line 30, please change "address" to --addresses--;

In Col.10, line 53, please delete "once";

In Col.10, line 54, please change "reading" to --the reading--; and

In Col.13, line 32, please change "When" to --If--.

Signed and Sealed this

Eighth Day of September, 1998

Attest:

BRUCE LEHMAN

*Attesting Officer*     *Commissioner of Patents and Trademarks*